United States Patent [19]

Cotton et al.

[11] 3,983,454

[45] Sept. 28, 1976

[54] DISTRIBUTION TRANSFORMER SECONDARY CIRCUIT BREAKER

[75] Inventors: John F. Cotton, Athens, Ga.; Jack G. Hanks, Bethel Park; Raymond E. Wien, Trafford, both of Pa.

[73] Assignee: Westinghouse Electric Corporation, Pittsburgh, Pa.

[22] Filed: Aug. 12, 1974

[21] Appl. No.: 496,800

[52] U.S. Cl. .................................. 317/14 J; 335/6; 335/17; 337/6; 337/72

[51] Int. Cl.[2] ..................... H02H 7/04; H01H 75/00

[58] Field of Search .................... 337/106, 72, 3, 6; 317/15, 14 J; 335/16, 6, 13, 17, 35

[56] References Cited

UNITED STATES PATENTS

| | | | |
|---|---|---|---|
| 2,169,586 | 8/1939 | Leonard | 337/72 |
| 2,298,229 | 10/1942 | Putman et al. | 317/14 J |
| 2,333,537 | 11/1943 | Leonard | 317/14 J |
| 2,351,983 | 6/1944 | Leonard | 317/14 J |
| 2,356,055 | 8/1944 | Hodnette et al. | 317/14 J |
| 2,468,645 | 4/1949 | Steinmayer | 317/14 J |
| 3,307,122 | 2/1967 | Ellenberger | 335/17 |
| 3,384,845 | 5/1968 | Johnson et al. | 335/16 |
| 3,517,356 | 6/1970 | Hanafusa | 335/16 |
| 3,883,781 | 5/1975 | Cotton | 335/17 |

*Primary Examiner*—Harold Broome
*Attorney, Agent, or Firm*—R. E. Converse, Jr.

[57] ABSTRACT

A distribution transformer having a secondary circuit breaker utilizing a movable bridging contact between two stationary contacts for completing a series circuit therethrough. The movable bridging contact is spring biased towards an open position separated from the stationary contacts, but with the circuit breaker in the normally closed position is held in engagement with the stationary contacts by a latching mechanism which is responsive to a bimetal or magnetic trip element to allow the circuit breaker to trip open during overload conditions. The conducting bridging contact completes a series circuit through the circuit breaker which opens during circuit interruption. The secondary circuit breaker can also, if desired, be provided with a signal-light circuit which activates a signal light, on the exterior housing of the transformer, when current through the circuit breaker exceeds a low signal overload value which is less than the trip value. The signal light circuit is reset by turning the operator handle, which is located on the transformer housing, past the on position away from the off position. An emergency overload control is provided for increasing the tripping level of the circuit breaker during selected overload periods. The bridging contact is disposed near the end of an elongated operating arm which is linked to the circuit breaker operating mechanism. A plurality of poles are operated utilizing only one operating mechanism by connecting the elongated operating arms with a strong metallic member for simultaneous operation of all poles. The single signal light provided for each multi-pole circuit breaker can be activated by the bimetals of any one of the individual poles.

17 Claims, 13 Drawing Figures

DISTRIBUTION TRANSFORMER SECONDARY CIRCUIT BREAKER

BACKGROUND OF THE INVENTION

This invention relates to circuit breakers of the type having a bimetallic thermal trip element and, more particularly, to circuit breakers for distribution transformers to control moderate power distribution on feeder circuits.

The disclosed circuit breaker is particularly adaptable for use with distribution transformers. Transformers used in power distribution systems are generally associated with a protective device which prevents or limits current overload damage to the transformer and its associated apparatus. The completely self-protected transformer includes a circuit breaker on the secondary or low voltage side to protect against damage due to overload currents. The secondary breaker disconnects the transformer from its load if the load current becomes dangerously high.

Commonly used circuit breakers incorporate three basic features: (1) a low overload signal device, (2) an incremental increase adjustment and (3) a tripping device to open the contacts of the circuit breaker upon a predetermined overload. As the load current through the circuit breaker increases a low overload point is reached at which the overload indicator signal switch closes and energizes a signal light on the outside of the transformer housing. The signal light which is mounted on the transformer enclosure, provides a visual indication that the secondary circuit breaker is about to trip. That is, the signal light is turned on at a lower overload than that required to trip the circuit breaker, indicating that load current is approaching trip level. The signal light remains on until reset, even though the load current later falls to a satisfactory level. When line crews see an illuminated signal light they are thereby given notice that a moderate overload condition has occurred. Repeated observations of an illuminated signal light usually indicate that the transformer should be replaced with a higher capacity transformer. The signal light also gives a quick and accurate visual indication of where a tripped breaker is located when a power outage occurs. As the load current continues to increase, a second overload point is reached where the circuit breaker trips open. The circuit breaker tripping protects the transformer against severe damage due to the flow of excessive overload currents.

To add extra loadability and minimize customer outage until transformer changeover can be implemented, an incremental load increase adjustment emergency control device is included in the circuit breaker. It is desirable, in many applications, to change the overload capacity of a distribution transformer. In these applications, reducing the transformer life somewhat by sustaining a moderate overload is better than interrupting the load current and causing a power outage. As stated, the completely self-protected transformer includes an emergency control device which effectively changes the rating of the associated circuit breaker. The emergency control mechanism can be moved from its normal position to allow the resetting of a tripped circuit breaker. The rating of the circuit breaker may be increased by the emergency control mechanism for a short period of time until the bimetal-actuated latch in the circuit breaker has cooled sufficiently to allow setting of the rating of the circuit breaker at its normal position.

A problem exists in some of the prior art transformer circuit breakers which use plastic members for the operating and/or support of the circuit breaker. Holding the many dimensions with the associated close tolerances requires extremely accurate molding. The hot oil environment in which the circuit breaker must function accurately is less than ideal for even the best plastics. The retention of the calibration during transformer processing and in service depends to a large extent on the plastic materials maintaining their specified dimensions. Another problem with many prior art transformer circuit breakers is the extensive use of flexible copper leads. In prior art circuit breakers a flexible lead is required entering the breaker at the single stationary contact to provide for contact movement during contact closure. A flexible lead is also required between the moving contact and the bimetal, and a flexible lead is also required to exit the breaker from the other end of the bimetal to allow for movement of the bimetal assembly during calibration and when the breaker is reset. The extensive use of copper braid and the many brazes required to fabricate the circuit breaker are difficult to control and expensive to manufacture. The large number of brazes is required for each prior art circuit breaker yields a higher probability of producing a substandard joint. This can be particularly serious upon joints close to the bimetal since a defective joint here will effect the calibration of the circuit breaker.

SUMMARY OF THE INVENTION

An oil filled transformer has a circuit interrupter disposed within the transformer housing and utilizes a bridging contact movable between an open position spaced from a pair of stationary contacts, and a closed position engaging the stationary contacts, to complete a series circuit through the transformer to a low voltage terminal located on the transformer housing. The bridging contact is spring biased towards the open position spaced from the pair stationary contacts, but when the circuit interrupter is closed the bridging contact is held in engagement with the pair of stationary contacts by a latching means. A bimetal actuating means which is disposed in series in the circuit through the transformer is connected so that when current flow therethrough exceeds an overload trip value the bimetal actuating means moves the latch to an unlatched position, permitting the circuit interrupter to trip open. The bimetal is responsive to the temperature of the surrounding oil and will deflect when the oil is heated for any reason. An operating handle for the circuit breaker is located on the outside of the transformer housing and is connected to an operating mechanism on the circuit breaker. The circuit breaker also includes a signal light contact which closes when current through the circuit breaker exceeds a low overload value less than the overload trip value. The signal light contact is connected to a signal light located on the exterior of the transformer housing for providing a visual indication that a low overload condition has been sustained. When the signal light circuit is activated, it will not automatically reset, but can be reset by moving the operating handle away from the off position past the normal on position. That is, with the circuit breaker in the on position the signal light contact is reset without moving the handle towards the off position, but by moving the operating handle past the on position. This prevents accidental tripping of the circuit breaker when resetting the signal light circuit. Emergency control, which is movable between a normal position and an overload position, is provided for increasing the required current flow for tripping the circuit interrupter.

The disclosed transformer secondary circuit breaker utilizes a single toggle and latching mechanism for operating two or three poles. The circuit breaker assembly is all metal with the exception of the conductor insulation. The only stranded copper conductor used is the flexible lead provided for attachment of the circuit breaker to the transformer terminals. Circuit interruption is provided by moving the bridging contact to open a pair of double break contacts. The disclosed invention reduces the number of required brazed connections and the overall height of the transformer circuit breaker, providing for a manufacturing cost improvement. In the disclosed transformer the circuit breaker contacts are located below the bimetal sensing element and if, for any reason, the transformer develops an oil leak the bimetal will be first exposed above the oil, causing the circuit breaker to trip while the contacts are still under oil. This sequence of operation prevents contact arcing in the volatile gas space above the reduced oil level.

The secondary circuit breaker provides a pair of stationary contacts which can be connected by a bridging contact completing a series circuit therebetween. The bridging contact is disposed at the end of an elongated contact arm which is pivotal around an axis to move the bridging contact between a closed position completing an electric circuit through the pair of contacts, and an open position spaced from the pair of contacts. A primary latch means is connected to the elongated contact arm for latching the contact in a closed position. A secondary latch means is provided for keeping the primary latch in the latched position. Bimetal actuating means, responsive to current, are provided for unlatching the secondary latch when current flowing through the circuit breaker exceeds a predetermined overload trip value. An overcenter toggle, which is spring biased towards a collapsed position, is connected to the elongated contact arm and is held in the overcenter extended position by the primary latch when the circuit breaker is in the normal closed position. When the secondary latch is unlatched due to current overload in the circuit breaker the primary latch moves to the unlatched position permitting the spring biased toggle to collapse and opening the circuit interrupter with a snap action.

The disclosed transformer circuit breaker can also include a magnetic trip which instantaneously starts to trip the circuit breaker when current flow therethrough exceeds a high overload value. The magnetic trip, which can be a single piece of sheet, steel is disposed in close proximity to the bimetal to be drawn towards the bimetal when current flow through the bimetal exceeds the high overload value. As the magnetic trip element is drawn towards the bimetal it unlatches the secondary latch permitting the circuit breaker to trip open.

The contact arms of the various poles are rigidly connected to a metallic shaft, which has relatively high strength, for simultaneous movement. Each pole of the circuit interrupter can include bimetallic thermal trip means and magnetic instantaneous trip means. The single emergency control is provided for increasing the bimetal deflections and thus the overload current required through any pole to trip the circuit interrupter. Only one signal light contact is provided which can be operated by any one of the plurality of poles of the circuit interrupter.

The disclosed circuit interrupter has many advantages over the prior art such as: (1) using metallic parts whenever possible to maximize dimensional stability throughout the required service temperature range; (2) using non-metallic insulating parts only as required for insulation; (3) minimizing the stranded copper conductors; (4) reducing to a minimum the number of brazes that are necesary to fabricate the circuit interrupters; (5) reducing the overall size and height of the circuit interrupter; (6) realizing improved circuit interrupter operations as compared with the prior art; (7) improving current limiting capabilities; and (8) providing a cost-improved product.

BRIEF DESCRIPTION OF THE DRAWINGS

For a better understanding of this invention reference may be had to the preferred embodiments exemplary of this invention shown in the accompanying drawings, in which.

DESCRIPTION OF THE PREFERRED EMBODIMENTS

Figure 1:
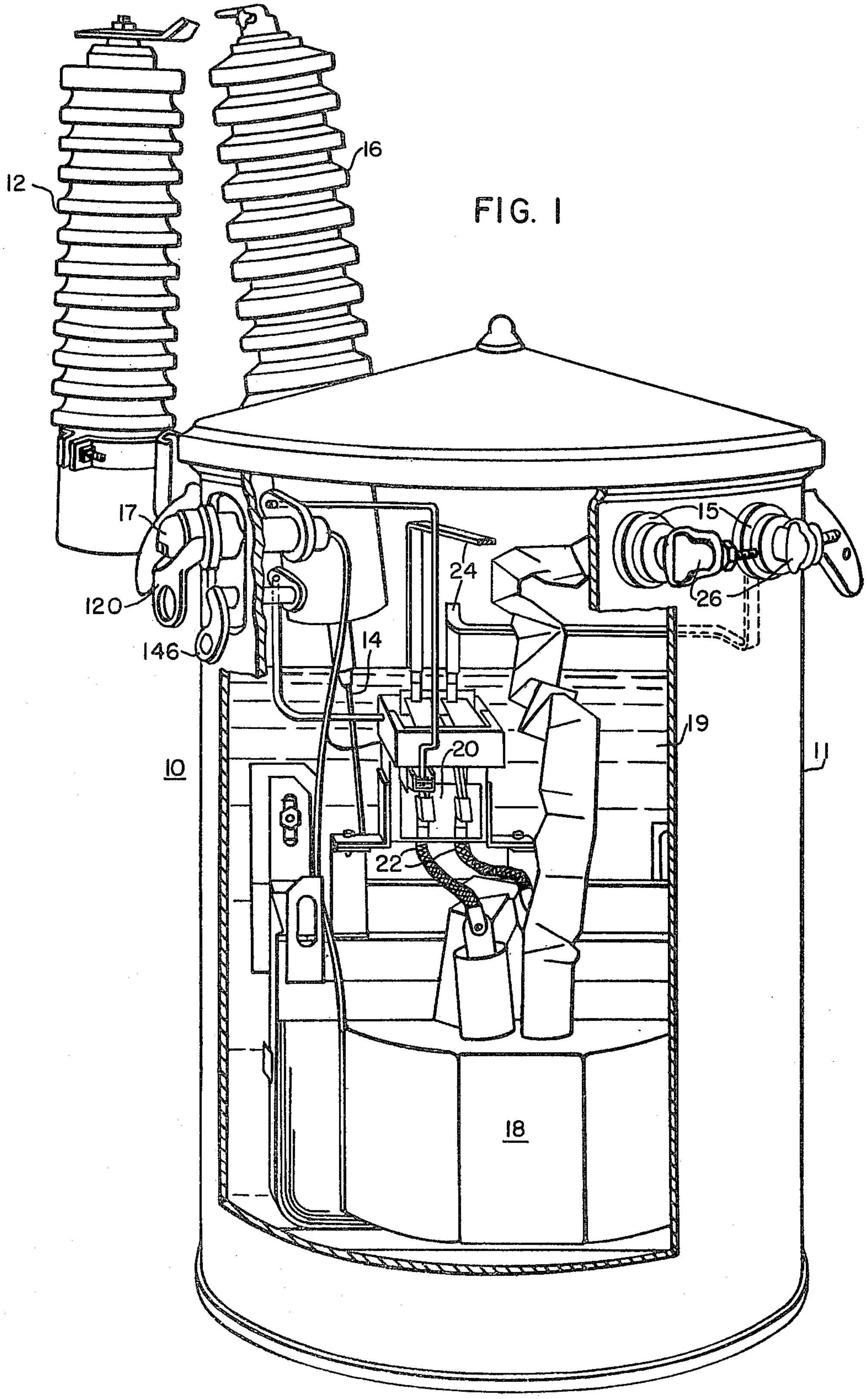
FIG. 1 is a perspecitve view of an oil filled distribution transformer utilizing the teaching of the present invention.

Referring now to the drawings and FIG. 1, in particular, there is shown a pole-type completely self protected distribution transformer 10 including a circuit breaker 20 utilizing the teaching of the present invention. The transformer 10 includes an enclosure or tank 11 with a lightning arrestor 12 and a primary high voltage bushing 16 mounted thereon. Secondary bushings, such as the low voltage bushing 15, are attached to the enclosure 11 to which the transformer load is connected. A signal light 17 is mounted on the enclosure 11 and is electrically connected to the circuit breaker 20 to be actuated at a predetermined low overload. The core and coil assembly 18 is secured inside the enclosure 11 with the circuit breaker 20 attached thereto. Required primary winding leads 14 extend from the core and coil assembly 18 to the appropriate high voltage bushings 16. The housing 11 is partially filled with an insulating liquid dielectric 19, such as transformer oil. The circuit breaker 20 and the core and coil assembly 18 are immersed in the insulating oil 19. Secondary connections 22, coming from the core and coil assembly 18, conect to input terminals on circuit breaker 20. Conductors 24 connect the output terminals of circuit breaker 20 to the low voltage bushings 15 mounted to the transformer tank 11. Appropriate loads can then be connected to the low voltage terminals 26 of the distribution transformer 10.

Figure 2:
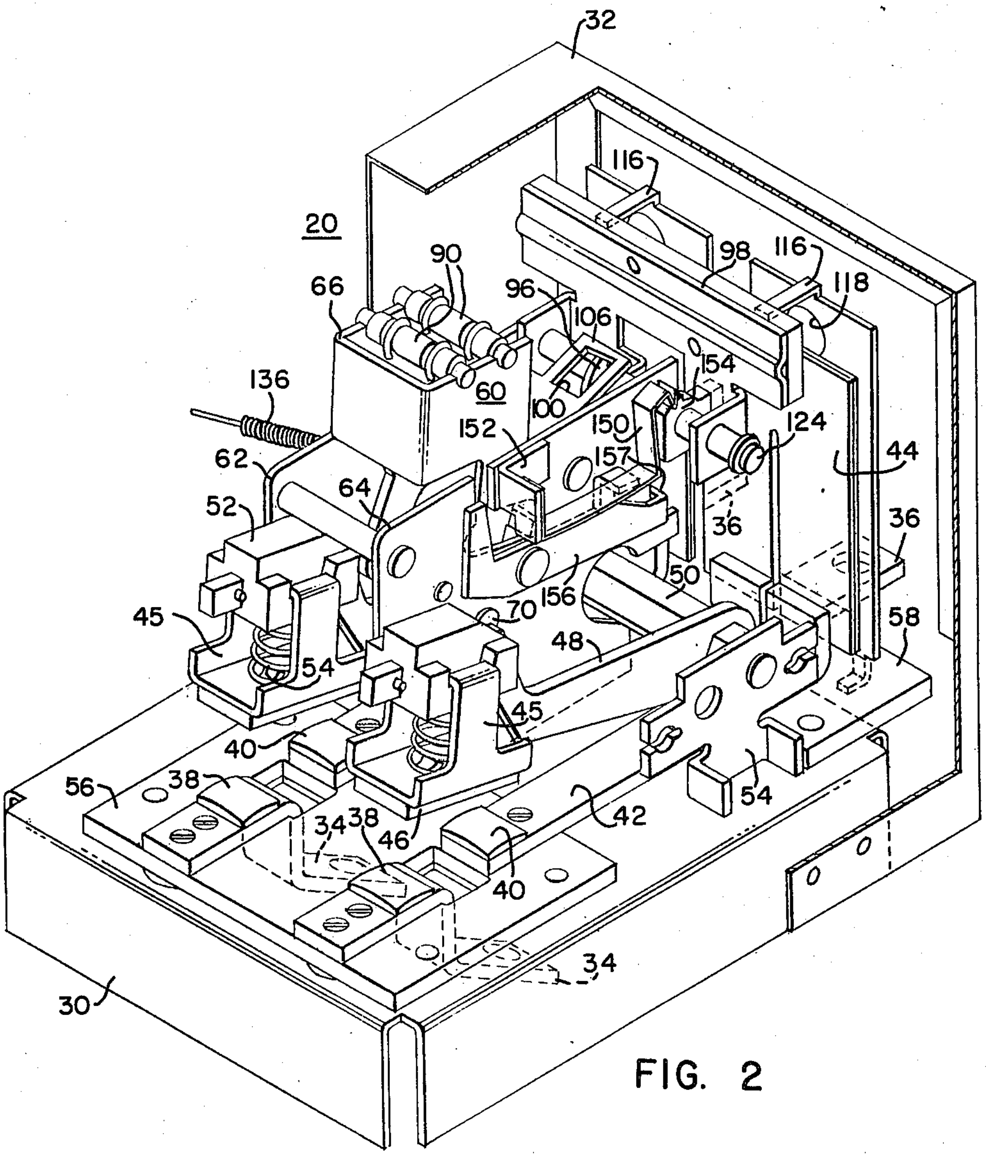
FIG. 2 is a perspective view of a secondary circuit interrupter for use on a distribution transformer utilizing the teaching of the present invention.

Referring now to FIGS. 2 through 12, there are shown embodiments of circuit breaker 20 utilizing the teaching of the present invention. FIG. 2 shows an isometric view of a two pole circuit breaker utilizing the teaching of the present invention. The circuit interrupter 20 is mounted on a metallic base 30. A cover 32 is provided partially surrounding the sensing and tripping elements of the circuit breaker 20 to provide protection during handling. Secondary leads 22 of the core and coil assembly 18 are attached to incoming circuit breaker terminals 34. Electrical conductors 24, disposed between the circuit breaker 20 and the low voltage transformer bushings 15, attach to circuit breaker 20 at terminals 36. Circuit breaker terminals 34 connect to stationary contacts 38. Circuit breaker terminals 36 connect to stationary contact 40 through electrical conductor 42 and bimetal 44. Stationary contacts 38 and 40 of each pole are disposed in a spaced apart relationship. A bridging contact 46 is provided which, with the circuit breaker in the closed position, completes an electrical connection between stationary contacts 38 and 40. Thus, with the circuit interrupter 20 closed an electric circuit is completed from a terminal 34 through stationary contact 38, through bridging contact 46, through stationary contact 40, through electrical conductor 42, through bimetal 44, to circuit breaker terminal 36. The bridging contact assembly 45 includes the movable bridging contact 46 attached to one portion thereof which, when the circuit interrupter is closed, completes an electrical connection between stationary contacts 38 and 40.

In the disclosed distribution transformer the bridging contact is located below the bimetal 44. This is a most desirable feature since if for any reason a transformer should develop an oil leak the bimetal will be first to be exposed above the oil in the gas space and will heat up rapidly, causing the breaker to trip while the contacts 46, 38 and 40 are still under the oil. This sequence of operation is desirable since it prevents contact arcing in the volatile gas space above the reduced oil level.

Each pole of the circuit breaker 20 is provided with an elongated contact arm 48 which at one end is rigidly secured to a through shaft 50. Shaft 50, which can be a metallic member, connects together the elongated contact arms 48 of all poles of the circuit interrupter 20 for simultaneous movement. That is, the contact arms 48 are connected together through shaft 50 so they move in unison. The bridging assembly 45 is connected to the end of the elongated contact arm 48 opposite shaft 50. An insulating member 52 is provided at the end of contact arm 48 so that contact arm 48 is electrically insulated from the contact bridging assembly 45. A spring 55 is provided in contact assembly 45 to provide uniform contact pressure and proper seating of the bridging contact 46 on the stationary contacts 38 and 40. As can be seen from the drawings, when any one of the poles of the circuit interrupter 20 open all the other poles must also open.

Through shaft 50 is rotatably supported by brackets 54 which are attached to the metallic base 30. Stationary contacts 38 and 40 are electrically insulated from base plate 30 by insulating sheet 56 which is secured to base plate 30. Terminal 36 is connected to insulating sheet 58 which is rigidly secured to base plate 30. Electrical conductor 42 is insulated from base plate 30 by insulating sheets 56 and 58 and transformer oil 19 which fills the open spaces in the circuit interrupter 20 during normal operation. Conductor 42 which is generally L-shaped has its short leg portion attached to one leg of bimetal 44. The other leg of bimetal 44 attaches to L-shaped terminal 36.

A single operating mechanism 60 is provided for operating all poles of the circuit interrupter 20. Operator 60 is connected to one of the elongated contact arms 48 and as this contact arm 48 is moved, in response to the positioning of the operator 60, the other elongated contact arm 48, connected through shaft 50, also responds. The single operating mechanism 60 for all poles is mounted on side plates 62 and 64 which are securely attached to support base 30. The operating mechanism comprises a U-shaped operating member 66, the two legs of which are pivotally connected to side plates 62 and 64 at points 68 and 70 respectively. A primary latch 72 is provided and is pivotally connected to a shaft 74 disposed between side plates 62 and 64. A pair of toggle links 76 and 78 are provided with one end of the toggle connected to the elongated contact arm 48 and the other end of the toggle connected to primary latch 72 and having multiple springs 80 connected between the knee of the toggle 82 and the top of U-shaped member 66 for raising contact arm 48 with a snap action when primary latch 72 is released. Toggle links 76 and 78 are pivotally connected together by knee pivot pin 82. The lower toggle member 76 is connected at its lower end by pivot pin 84 to an elongated contact arm 48. The upper ends of the pair of toggle links 78 have a U-shaped slot formed therein which fits around a shaft 86 connected to primary links 72. That is, primary latch 72 is disposed between the pair of toggles 78 so that shaft 86 fits into the U-shaped slot formed in the upper toggle links 78. Spring holders 88 are attached to knee pin 82 and engage the lower ends of the plurality of springs 80. Shafts 90 fit on top of U-shaped member 66 and are engaged by the upper end of springs 80. The upward force exerted by springs 80 holds toggle links 78 in engagement with shaft 86 on primary latch 72. When the circuit breaker is assembled the ends of the pair of links 78 are crimped to assure they remain in engagement with pin 86. Releasably primary latch 72 is held in a latched position by secondary latch 92. Secondary latch 92 is biased toward an unlatched position by torsion spring 94. When secondary latch 92 moves to the unlatched position primary latch 72 is released and rotates around shaft 74 due to the force of springs 80 collapsing the toggle 76–78 and raising the elongated contact arm 48.

Figure 7:
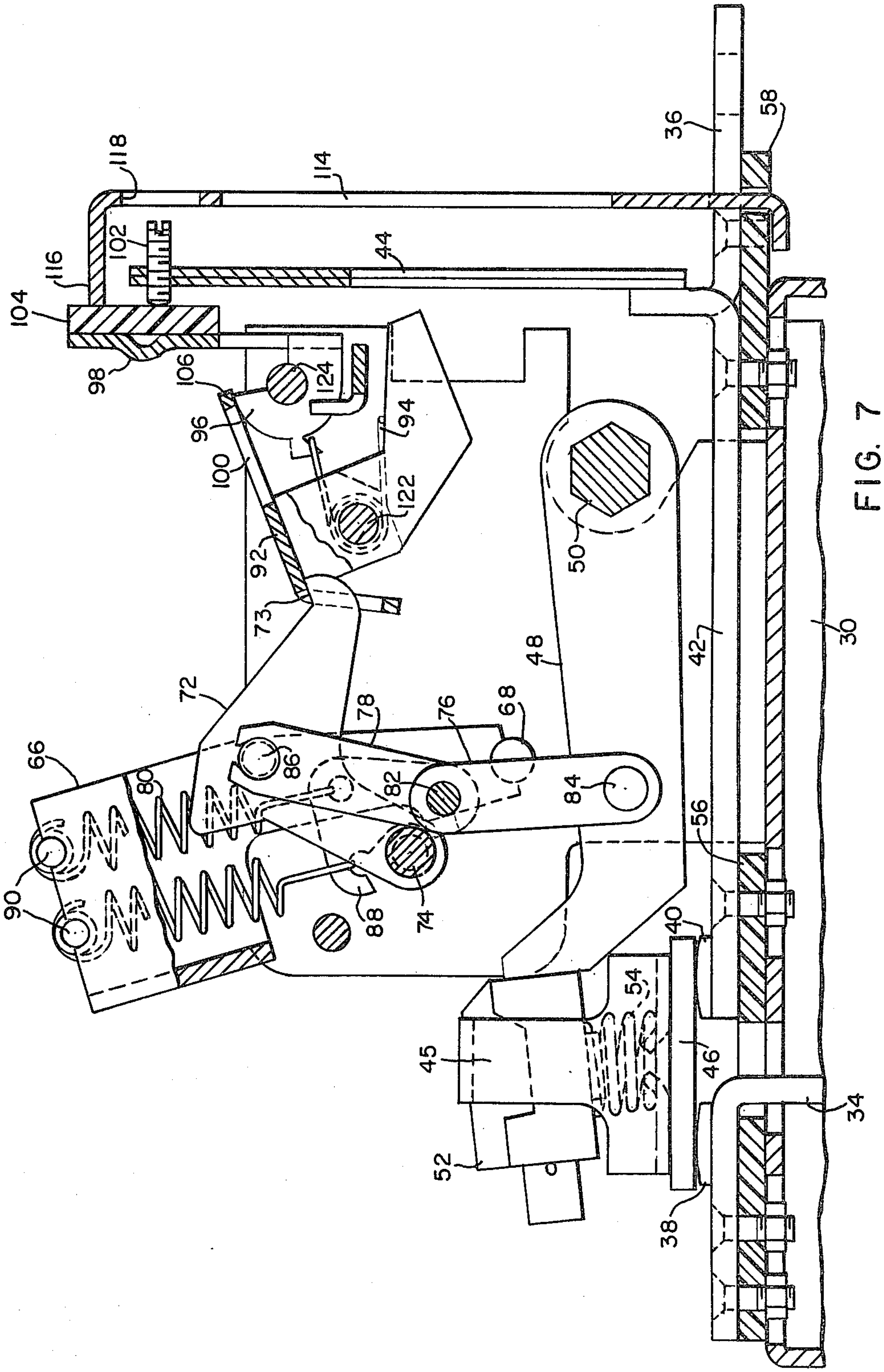
FIG. 7 is a side view of the circuit interrupter shown in FIG. 2, having portions removed for clarity, with the circuit breaker in the closed position.

Secondary latch 92 is prevented from moving to the unlatched position when the breaker is closed by a cam surface 96 which is part of a trip bar mechanism 98. As can be seen in FIG. 7 with the circuit breaker normally closed, a portion 106 of secondary latch 92 rests against the cam surface 96. When the trip bar mechanism is rotated a predetermined angle counterclockwise the cam surface 96 passes through opening 100 in secondary latch 92 permitting secondary latch 92 to rotate to the unlatched position releasing primary latch 72 and tripping open the circuit breaker 20. Trip bar mechanism 98 is connected to be rotated by current responsive means when the current through the circuit breaker 20 exceeds a predetermined value.

Each pole of the circuit breaker 20 is provided with an individual trip device including a current responsive bimetal elements 44, through which the load current of associated pole passes. That is, the bimetal element 44 is electrically connected in the circuit of the circuit breaker 20 in series relation with the breaker contacts 38, 40 and 46. The bimetal 44 is generally U-shaped with an adjusting screw 102 threadedly mounted in the bight portion. One leg of the bimetal 44 is connected to fixed conductor 42 and the other leg of bimetal 44 is connected to fixed terminal 36. Adjusting screw 102 is disposed so as to contact an insulating portion 104 of trip bar mechanism 98 when bimetal 44 deflects. Upon occurrence of, for example, an overload of less than 500% of normal rated current, the bimetal element is heated and deflects toward the trip bar mechanism 98. As the bimetal element deflects due to the flow of current therethrough, the rounded edge of adjusted screw 102 engages the insulating sheet 104 attached to trip bar mechanism 98, rotating the trip bar 98 counterclockwise to a tripped position releasing secondary latch 92 and tripping open the circuit interrupter 20. The cam poriton 96 of trip bar mechanism 98 moves from under the latching surface 106 to release the secondary latch 92. Primary latch 72 then rotates around pivot 74 moving the line of action of the springs 80 to the left of toggle pivot knee 82 causing the toggle 76–78 to collapse and opens the circuit interrupter 20 with a snap action.

Figure 8:
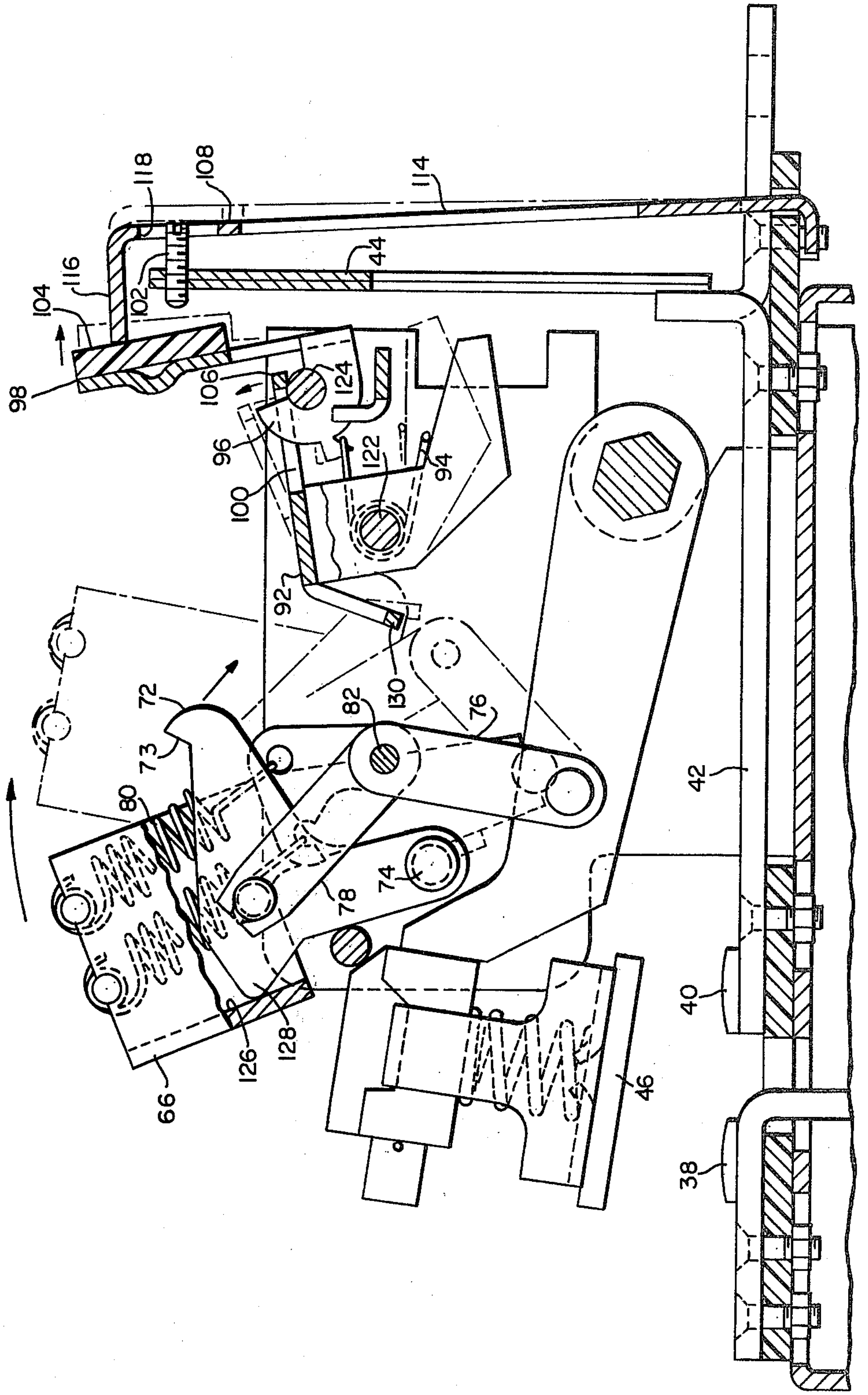
FIG. 8 is a side view of the circuit breaker shown in FIG. 2 having portions removed for clarity in the tripped open position.

Electromagnetic means is also provided to instantaneously trip the breaker. The electromagnetic trip means comprises a ferromagnetic member 108, disposed in proximity to bimetal element 44. Ferromagnetic member 108, formed from a single piece of sheet steel, is supported by two leg portions 110 and 112 which are secured in a pivotal manner to insulating member 58, as can best be seen in FIG. 6. A main opening 114 is formed through member 108 to achieve proper attraction during the required operation. A short arm 116 extends from electromagnetic trip member 108 towards the trip bar mechanism 98. Upon occurrence of a high overload current, of say for example, greater than 500% of normal rated current flowing through the bimetal 44, the electromagnetic trip member 108 is drawn towards bimetal 44 in response to the overload current whereupon arm 116 engages insulating sheet 104 of trip bar mechanism 98, rotating trip bar mechanism 98 to trip open the circuit interrupter 20. Electromagnetic trip member 108 almost instantaneously trips open the circuit breaker 20 in the high overload conditions without moving bimetal 44. As can be seen in FIG. 8 as electromagnetic element 108 is drawn towards bimetal 44 trip arm 116 rotates trip bar 98 to release secondary latch 92 causing the circuit breaker 20 to trip open. The breaker 20 opens, current flow through the bimetal ceases, and electromagnetic member 108 returns to its normal position. An opening 118 is also formed in electromagnetic trip member 108 to provide access to and clearance for adjusting screw 102 which is disposed in the bimetal 44.

Figure 9:
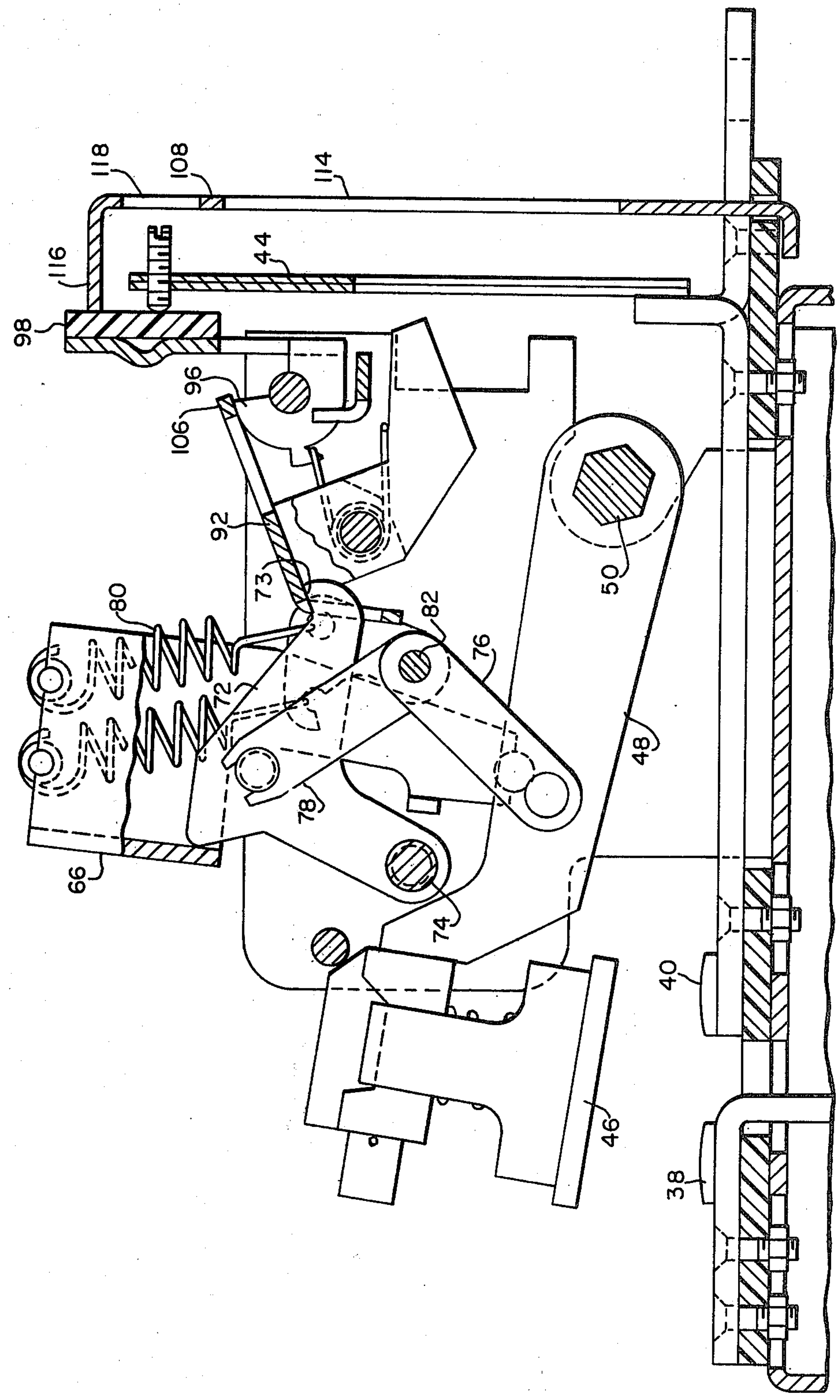
FIG. 9 is a side view of a portion of the circuit interrupter shown in FIG. 2 in the normal open position.

Operating member 66 which rotates about pivots 68 and 70 provides a connection for one end of springs 80 and is mechanically linked to an operating handle 120 disposed on the transformer tank 11. Operating handle 120 is movable between an on position closing the circuit breaker 20 and an off position opening circuit breaker 20. The circuit breaker contacts 38, 40, and 46 are manually opened by clockwise movement of operating member 66, as viewed in FIG. 7, as operating handle 120 is moved to the off position. Clockwise movement of the operator 66 carries the line of action of the overcenter springs 80 to the right of the longitudinal axis of link 78 whereupon the force of springs 80 causes a collapse of toggle 76–78, thereby moving the bridging contact 46 to the open position with a snap action. Contacts are closed by counterclockwise movement of the operator 66, as seen in FIG. 9. This moves the line of action of the springs 80 across to the left of the longitudinal axis of link 78 about pivot pin 86. Consequently the springs 80 actuate the toggle 76–78 to its extended overcenter position, thereby moving the movable bridging contact 46 to the closed position with a snap action.

The circuit interrupter 20 is held in the closed position by primary latch 72 which is rotatable about pivot point 74. The latching surface 73 on primary latch 72 is engaged by a portion of secondary latch 92 to hold primary latch 72 in the latched position. When secondary latch 92 rotates in a clockwise direction about pivot 122 primary latch 72 is released. Springs 80 force link 78 into engagement with shaft 86 of primary latch 72 and provide a counterclockwise bias on primary latch 72. That is, when primary latch 72 is released by secondary latch 92 springs 80, acting through link 78, rotate primary latch 72. When primary latch 72 is rotated a distance sufficient so that the longitudinal axis of link 78, which is also the connecting axis between the center pin 82 and shaft 86, passes to the left of the line of action of springs 80 formed between pin 82 and top support pins 90, the toggle 76–78 collapses with a snap action moving to the position shown in FIG. 8. That is, when primary latch 72 is released, it rotates permitting toggle 76–78 to collapse, opening circuit interrupter 20. Latch 72 is released when the current flow through the breaker exceeds a select overload value. Secondary latch 92 holds primary latch 72 in a latched position. When secondary latch 92 rotates clockwise around shaft 122 to the position shown in FIG. 8 primary latch 72 is released, tripping open the circuit breaker 20. Secondary latch 92 is held in a latched position by cam 96 of trip bar 98. Trip bar 98 is mounted for rotation on shaft 124. When trip bar 98 is rotated counterclockwise around shaft 124 secondary latch 92 is released permitting the circuit breaker 20 to trip open.

When the circuit interrupter 20 has tripped open, the primary latch 72 and the secondary latch 92 must be reset to a latched position before the circuit breaker can be closed. Relatching of the operating mechanism is effectuated by movement of the operator handle beyond the off position. Moving the operator handle to the off position moves operating part 66 in a clockwise direction. During this movement a portion 126 of operator 66 engages a projection 128 of primary latch 72 moving primary latch 72 in a clockwise direction about pivot 74. As operating part 66 is moved beyond the normal off position latch 72 engages a portion 130 of secondary latch 92, rotating secondary latch 92 in a counterclockwise direction, releasing trip bar 98, and permitting trip bar 98 to rotate about shaft 124 under the influence of biasing spring 94. Trip bar 98 rotates to a position securing latch 92, but is prevented from rotating to a full upright position by a signal latch 150. Trip bar 98 thus rotates to a position where cam surface 96 acts as a support for secondary latch 92, holding secondary latch 92 latched. As the operator 66 moves from a reset position beyond the normal off position back to the normal off position surface 73 of primary latch 72 engages secondary latch 92 latching secondary latch 72 in the normal reset position. At this time primary latch 72 and secondary latch 92 are both in the latched position as illustratd in FIG. 9. The circuit breaker 20 may then be closed by movement of the operating handle 120 to the on position causing the circuit breaker 20 to close in the previously described manner.

It is at times essential that operation of a transformer 10 be restored, at least temporarily, immediately after the circuit has been opened by operation of the transformer breaker 20 in response to an overload condition. However, there are occasions where it is difficult or impossible to reclose the breaker 20 especially if the oil 19 has been heated by a long continued overload current or a high ambient temperature, since the hot oil 19 maintains the bimetal element 44 deflected to its trip position and the operating assembly 60 cannot be reset. An emergency control is provided for emergency adjustment of the tripping mechanism to permit the circuit breaker to be closed and latched immediately following a tripping operation.

Figure 3:
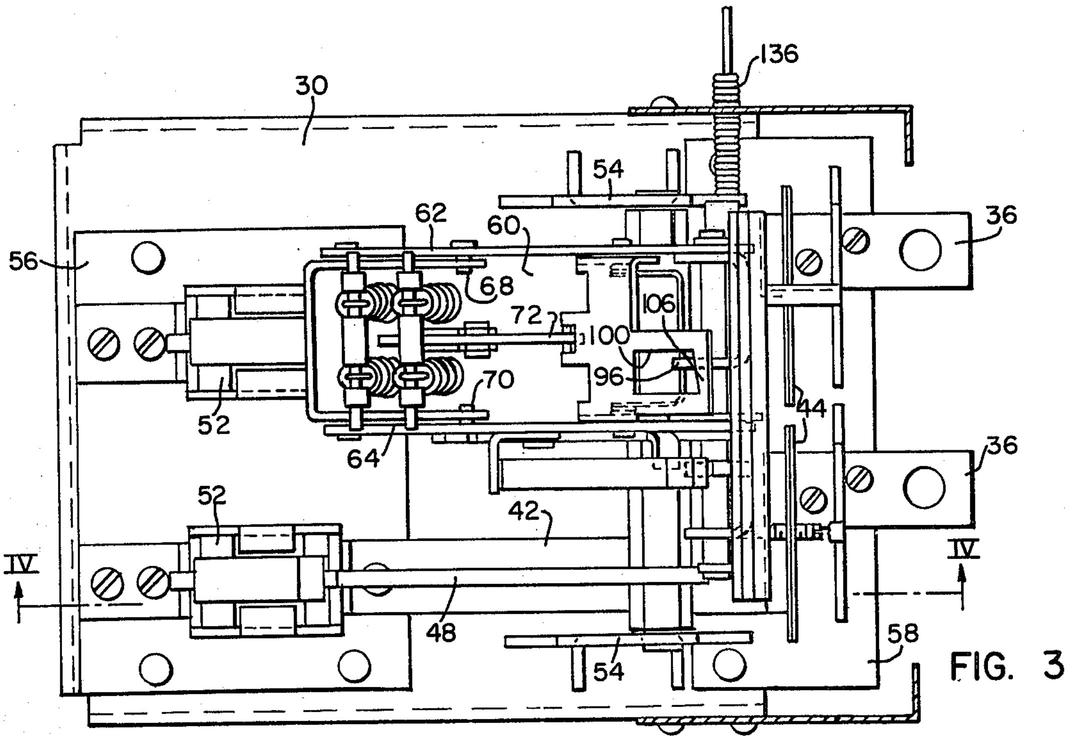
FIG. 3 is a top view of the circuit interrupter shown in FIG. 2 with the contacts in the closed position.
Figure 4:
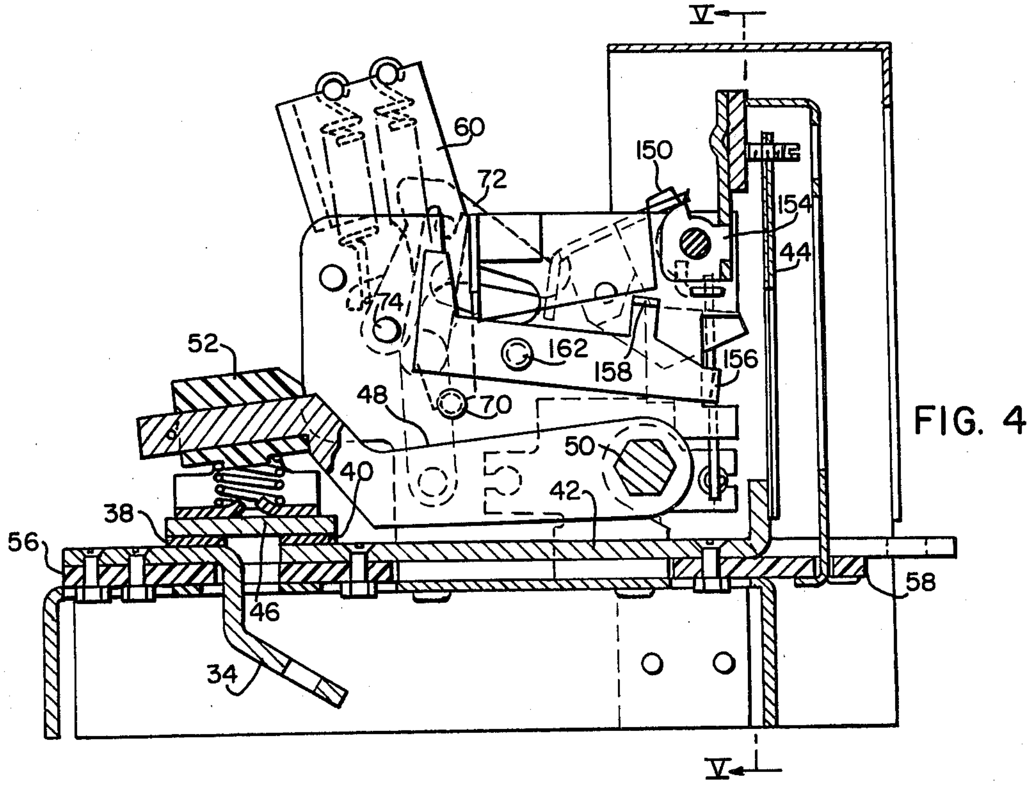
FIG. 4 is a side view of the circuit interrupter shown in FIG. 3 along the lines IV—IV.
Figure 5:
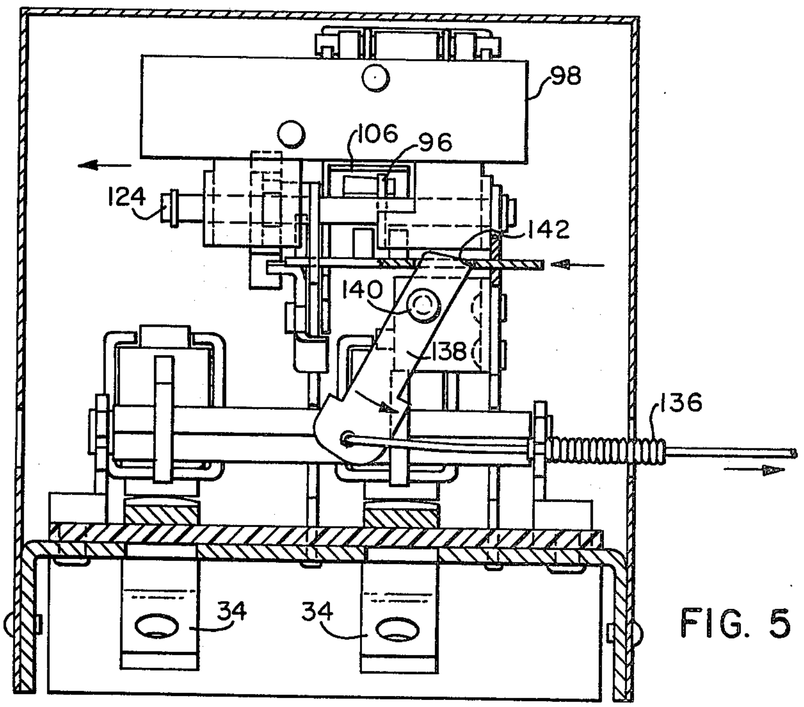
FIG. 5 is a view of the circuit interrupter shown in FIG. 4 along the lines V—V.
Figure 6:
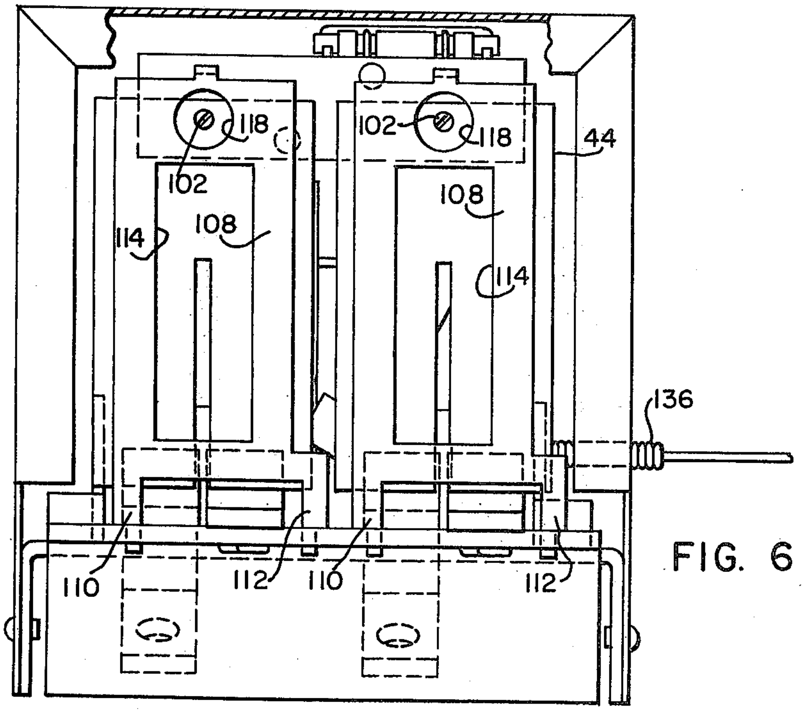
FIG. 6 is a rear view of the circuit interrupter shown in FIG. 2.
Figure 13:
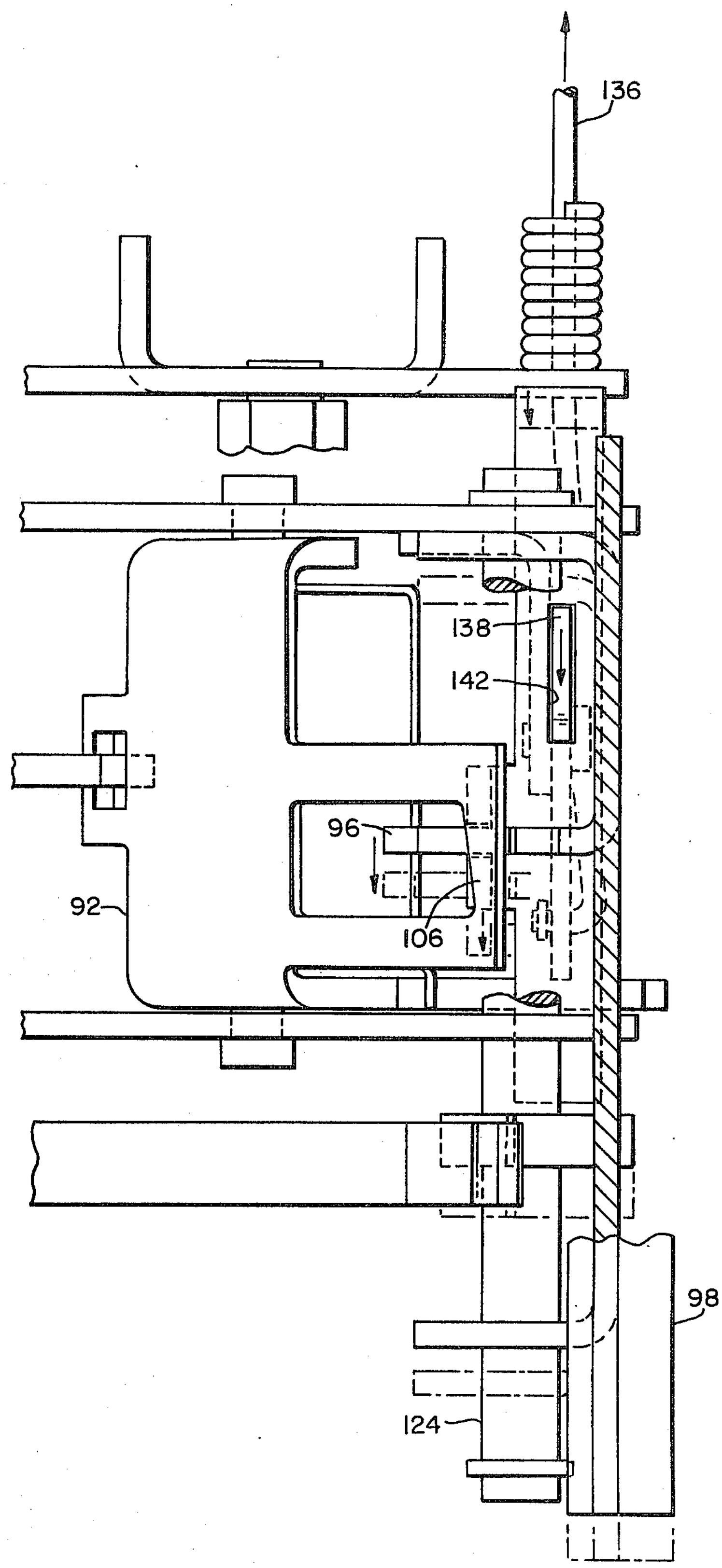
FIG. 13 is a top view of a portion of the circuit interrupter shown in FIG. 2, showing the emergency control settings.

The emergency control permits the breaker 20 to temporarily carry a certain percentage of overload current for a predetermined time. The emergency control essentially permits changing of the circuit breaker 20 trip level. The emergency control can best be understood with reference to FIGS. 2, 3, 5 and 13. Trip bar mechanism 98 is slidably attached to shaft 124. The latching surface 106 of secondary latch 92, which is held by cam 96, is of a non-uniform width. That is, the latching surface as viewed in FIGS. 3 and 13 is narrowest at the right hand or bottom end thereof and becomes progressively wider towards the left or top end thereof. During normal operation of the circuit interrupter, as shown by phanton lines in FIG. 13, the cam 96 supports a narrow portion of the latching surface 106. During an emergency operation the trip bar mechanism 98 is slided along shaft 124 to a position as shown in FIGS. 3, 5 and 13 wherein the cam surface 96 supports a wider portion of latching surface 106, thus requiring further rotation of cam 96 to release secondary latch 92. This increased rotation of the trip bar mechanism 98 around shaft 124 required to release secondary latch 92 effectively increases the circuit breaker 20 rating. As can best be seen in FIG. 5, push-pull cable 136 connects to a lever 138, pivoted about point 140 and having a free end which engages a slot 142 formed in a portion of the trip bar assembly 98. As push-pull cable 136 is operated the trip bar assembly 98 along the longitudinal axis of shaft 124 effectively changing the circuit breaker 20 rating. During normal operation a narrow portion of latch surface 106 rests on cam 96 and during emergency overload operation a wide portion of latch surface 106 rests on cam surface 96. Push-pull cable 136 is connected at one end to lever 138 and at the other end to operating handle 146 which is mounted externally on the transformer tank 11. Thus, the rating of the circuit breaker 20 can be increased by moving the external emergency control handle 146 from the normal position to the emergency overload position.

Figure 11:
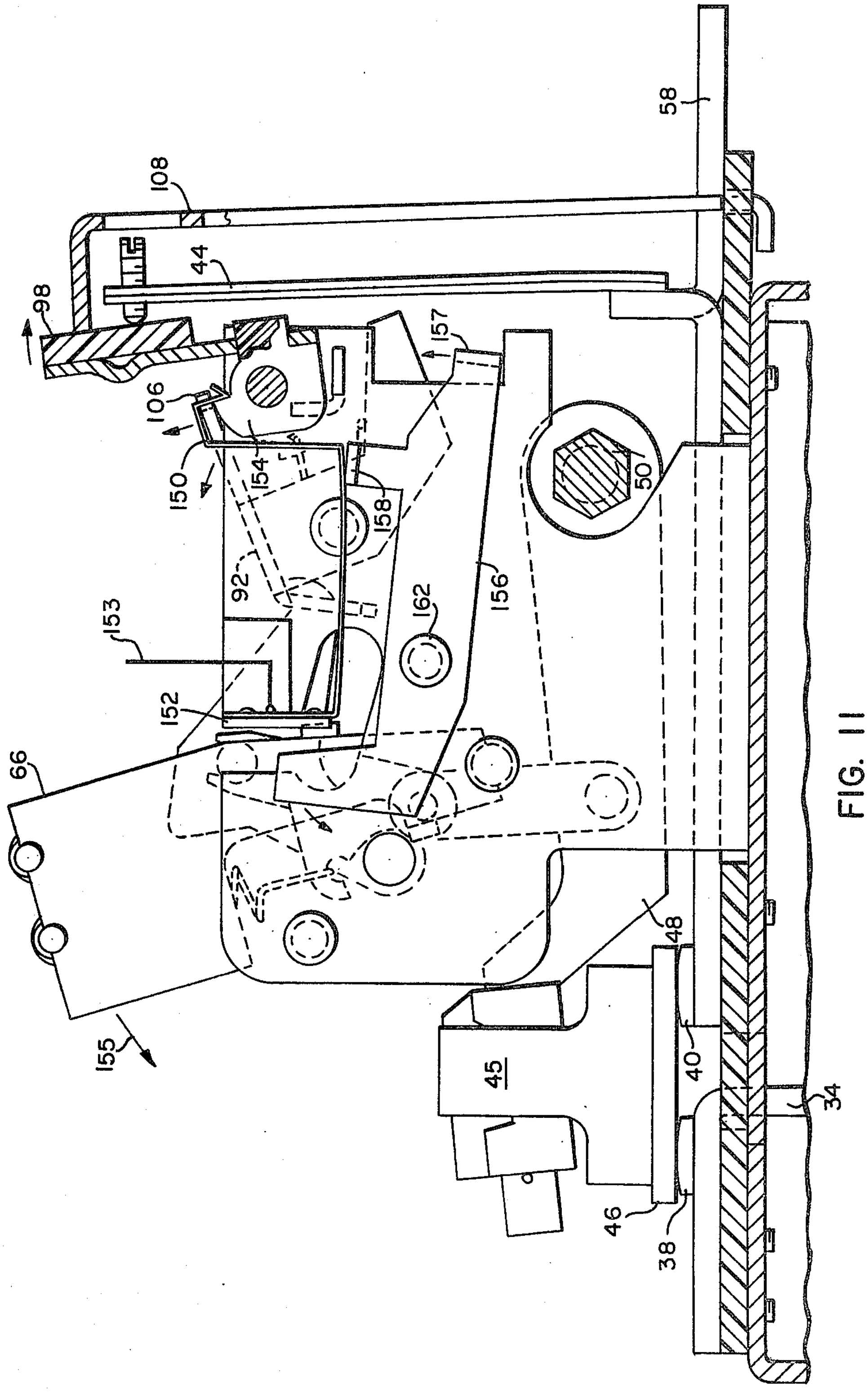
FIG. 11 is a side view of a portion of circuit interrupter shown in FIG. 2 with the signal contact in the closed position.
Figure 12:
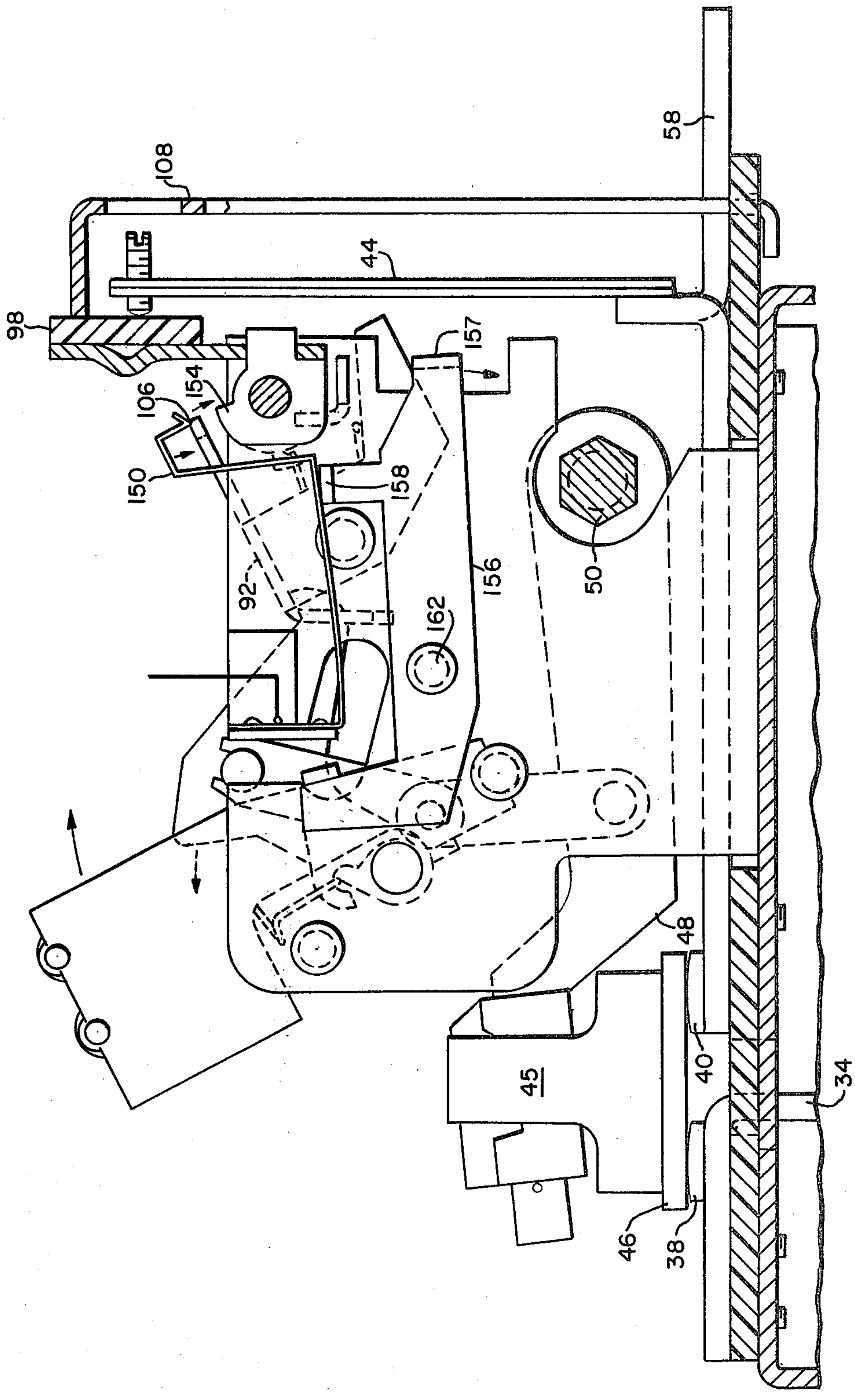
FIG. 12 is a side view of circuit interrupter shown in FIG. 2 with the operating handle moved past normal position to reset the signal light contact.

Signal means is also provided for indicating an overload condition that is not of sufficient magnitude to trip the breaker 20 open, but which indicates that the current in the circuit is approaching a dangerous overload condition or that a dangerous overload condition has existed and has cleared itself without tripping the breaker 20. The signal indicating means also indicates that the breaker 26 has been tripped open in response to an overload current. As can best be seen in FIGS. 11 and 12, the signal means comprises a signal latch 150, which when unlatched, closes a signal contact on circuit breaker 20, lighting signal light 17 visible on the external transformer tank 11. Signal latch 150 is formed from an electrically conducting spring member which is supported by, but insulated from, bracket 152 attached to side plate 64. In the normal latched position a portion of signal latch 150 rests on insulating cam 154, which is rigidly connected to trip bar mechanism 98 for unitary movement therewith around shaft 124. As trip bar mechanism 98 is rotated due to an overload current cam 154 also rotates. Signal light cam 154 is constructed so that as the trip bar 98 is rotated, signal latch 150 is unlatched before secondary latch 92. A reset link 156 having a contact arm 158 is disposed near a spring latch 150. As cam 154 rotates and signal latch 150 is released, member 150 contacts arm 158 completing a signal circuit through breaker 20, as can best be seen in FIG. 11. Power is provided from the core and coil assembly 18 with the signal light 17 disposed in series with the contact formed by signal latch 150 and the contact arm 158. Thus, when cam 154 is rotated sufficiently, signal latch 150 drops into contact with reset link 156 completing an electric signal circuit and lighting signal light 17. Conductor 153 connected to signal latch 150 is used to complete a circuit to signal light 17. When cam 154 is rotated sufficiently so that signal latch 150 drops, it engages cam 154, as shown in FIG. 11, preventing cam 154 from rotating clockwise due to spring 94 if the overload condition is removed. That is, once an overload condition, sufficient to activate the signal circuit has occurred, the signal circuit will mechanically seal itself and remain activated until reset. If the circuit breaker 20 has not tripped open, but the overload condition has been removed from the signal latch, it can be reset by moving operator 66 past the on position, as indicated by arrow 155 of FIG. 11. The signal light circuit is constructed to be adjustable independent of the circuit breaker trip point. During calibration the signal light trip point can be adjusted as desired.

Figure 10:
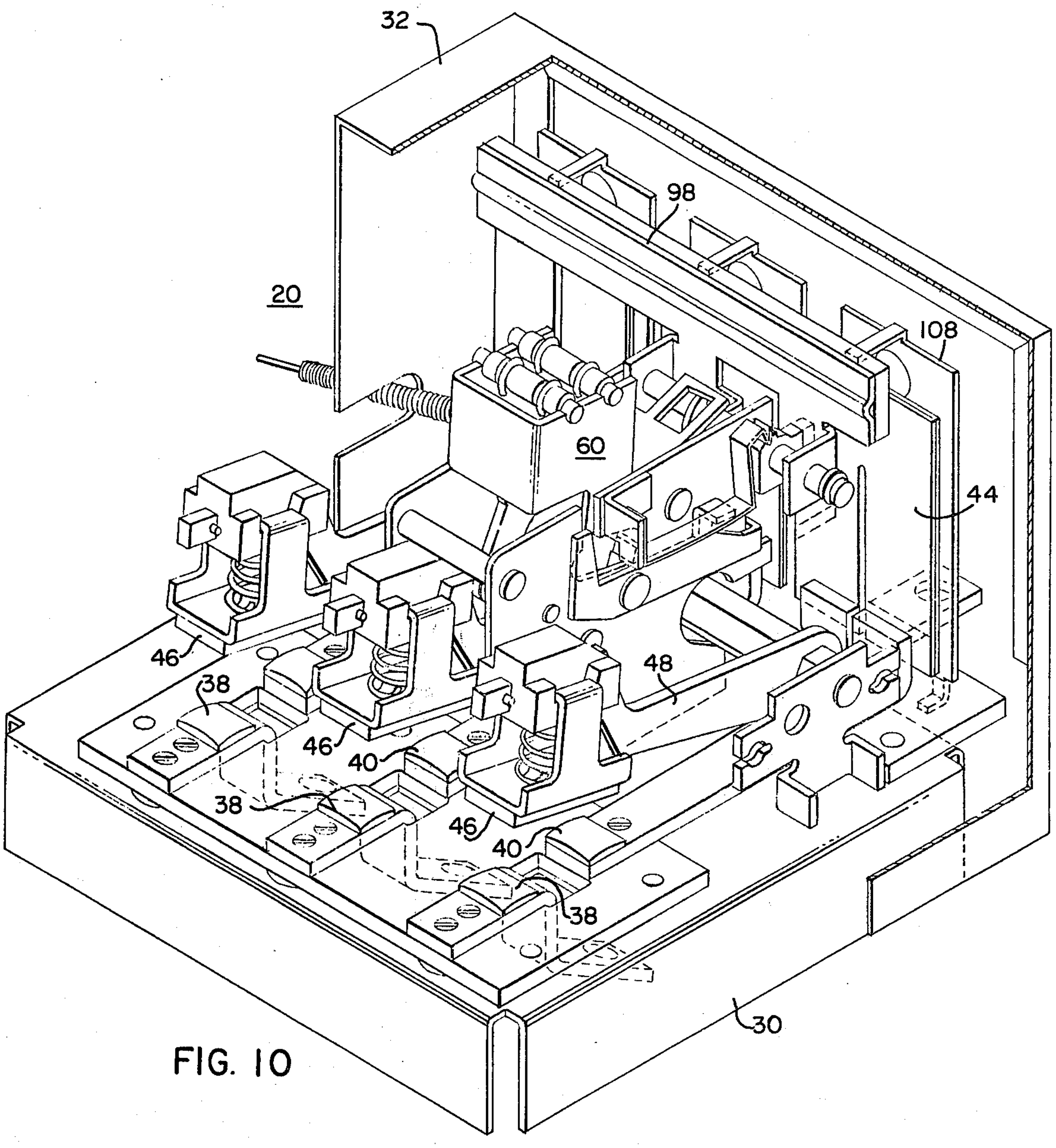
FIG. 10 is an isometric view of a three pole circuit interrupter utilizing the teaching of the present invention.

Moving operator 66 past the on position pivots reset link 156 in a counterclockwise direction about pivot 162 and contact arm 158, which is engaging signal latch 150, raises signal latch 150 while at the same time arm 157 on reset link 156 engages and rotates secondary latch 92, permitting signal cam 154 to rotate clockwise to an upright position. This can be seen clearly in FIG. 12 which shows surface 106 and signal latch 150 in the raised position, not in engagement with cam 150. When operator 66 is then moved back to the on position, latch 150 rests against signal cam 154 and is spaced from contact arm 158, thus resetting the signal light circuit. When the contacts of the circuit interrupter open, due to an overload condition, the signal light conduit is also completed energizing signal light 17. When the operating assembly 60 is reset by moving the operating handle 120 past the normal off position, the signal latch 150 is not reset. The signal light will be reset when the circuit interrupter 20 is switched on and moved past the normal on position. Cam 154 and spring latch 150 are wide enough so that during emergency overload operation when the trip bar mechanism 98 is slided along shaft 124 operation of the signal latch is not affected. Whether the circuit is two or three poles only a single signal latch 150 is provided. The signal latch will respond to an overload through any of the poles. Whether the circuit interrupted 20 is of a two pole variety as shown in FIG. 2 or a three pole variety as shown in FIG. 10, only one operating assembly 60 is required. All poles are operated simultaneously by a rigid metallic shaft 50.

The disclosed transformer circuit interrupter 20 has advantages over prior art transformer circuit breakers such as using metallic parts whenever possible, to maximize dimensional stability and provide strength throughout the required operating temperature range and using plastic or insulating members only as required for insulation. The disclosed circuit interrupter minimizes use of flexible copper conductors and reduces the required number of brazes necessary to fabricate the conductor assembly. The disclosed circuit interrupter 20 provides a size reduction and cost improvement over the prior art.

Circuit breaker 20 uses a single toggle and latching operating mechanism 60 to operate two or three poles. The operating assembly 60 is all metal with the exception of the conductor insulators. The only braided copper conductor used for the flexible leads 22 provided for attachment of the circuit breaker 20 to the transformer core and coil assembly 18. Circuit interruption is accomplished by opening a pair of double break contacts. An arc blow out loop is formed by conductor 34 to move the arc formed between bridging contact 46 and stationary contact 38. The series arcs formed between stationary contact 38 and bridging contact 46 and between bridging contact 46 and stationary contact 40 also tend to drive the arcs formed during circuit interruption away from the contacts. Use of the double break switching contacts 46 permits elimination of flexible leads required in some prior art single break construction. The double break switching contact provides a circuit interrupter 20 with exceptional current limiting ability, greater than what is available in the prior art. Current limiting during circuit interruption is provided in two ways. First the arc voltage across each contact is half of what appears across single or parallel caontacts. This reduces the arc voltages across each series contact pair. Second, the current loops formed by the arc columns in the circuit during interruption produce high magnetic forces which drive the arc columns apart and away from the contacts. That is, when the circuit interrupter 20 opens under load, two series-related arcs are formed, one between contact 38 and 46, and the other from contacts 46 to contact 40. The magnetic force generated by these arcs which are electrically in series, but physically disposed in parallel, drives them apart. The result is a large reduction of fault current magnitude and duration, typically limited to less than that provided in the prior art.

The bridging contact assembly 45 also provides for contact blow-off during high overload current which helps in current limiting. Use of controlled contact blow-off with a bridging contact is not provided in prior art distribution transformer applications. The operating assembly 60 and the bridging contactor assembly 45 are constructed to take advantage of overload magnetic forces that can cause separation before circuit unlatching occurs. The magnetic trip system provided in the disclosed breaker 20 is quick enough to unlatch and allow the contacts to continue opening, after they have been blown off due to a high overload current, before the separation closes as overload current diminishes. That is, during a high fault current the bridging assembly 45 is blown away from stationary contacts 38 and 40 and the operating mechanism is then unlatched before the bridging contact assembly 45 can again engage the stationary contacts 38 and 40, as current is reduced at the end of one half cycle. The result is extremely fast fault clearing. The combined effect of the double break contact, the overload blow-off and the fast unlatching creates a high degree of current limiting action. An experimental test showed currents have been limited, with a duration of less than one half cycle at maximum fault conditions. Quick opening of the circuit interrupter 20 is also desirable for increasing contact life. Under delayed unlatched conditions contact separation is highly detrimental. Considerable contact erosion occurs during high fault currents with a high probability that the contacts will weld closed.

What we claim is:

1. A distribution transformer, comprising:

a housing;

primary and secondary transformer coils disposed within said housing;

a circuit interrupter disposed within said housing and operable between a closed position permitting current flow through said transformer and an open position interrupting current flow through said transformer, said circuit interrupter being operable to automatically trip to said open position upon overload current conditions through said transformer;

a handle connected to said circuit breaker for manually operating said circuit breaker between said open and closed positions;

signal means for indicating when current flow through said transformer exceeds a predetermined level; and signal reset means for ceasing signal indication, said reset means being connected to said handle and resetting said signal means when said handle is operated past the closed position away from the open position.

2. A distribution transformer as recited in claim 1; wherein said circuit interrupter comprises releasable latch means operable to maintain said circuit breaker in a closed position;

trip means operable upon overload current conditions to initiate release of said latch means; and rotatable trip bar means connecting said latch means and said trip means.

3. A distribution transformer as recited in claim 2 wherein said signal means comprises signal contact means disposed in relation to said trip bar means, rotation of said trip bar means causing activation of said signal contact means.

4. A distribution transformer as recited in claim 3 wherein said circuit interrupter comprises separable contacts;

said latch means comprises a primary latch for maintaining said contacts in a closed position when said primary latch is in a latched position, and a secondary latch for maintaining said primary latch in a latched position; and said trip means comprises thermal trip means for rotating said trip bar means to activate said signal contacts and unlatched said secondary latch when overload current occurs.

5. A distribution transformer as recited in claim 4 wherein said trip bar means comprises a cam including a recessed portion; and said secondary latch comprises a latching surface disposed transverse to said cam and spring-biased to rest upon said cam, rotation of said cam causing said recessed portion to move under said latching surface and release said secondary latch.

6. A distribution transformer as recited in claim 5 wherein said latching surface is of varying width so that when resting on a first portion of said latching surface said cam must rotate through a first arc to release said secondary latch and when resting on a second portion of said latching surface said cam must rotate through a second arc greater than said first arc to release said secondary latch; and emergency control means connected to said cam to move said cam for engagement with the first portion of said latching surface to engagement with the second portion of said latching surface.

7. A distribution transformer as recited in claim 3 wherein said signal contact means comprises a signal cam mounted upon said trip bar means and a releasable signal latch movably mounted upon said circuit breaker and resting upon said signal cam, rotation of said trip bar means rotating said signal cam and releasing said signal latch to complete an electrical circuit through said signal means.

8. A distribution transformer as recited in claim 7 wherein said signal reset means comprises a pivotally mounted reset link operably connected to said handle and disposed in relation to said signal latch and said signal cam, operation of said handle through the closed position away from the open position pivoting said reset link and causing said reset link to raise said signal latch and permit said signal cam to rotate under said signal latch.

9. An oil-filled distribution transformer having a secondary circuit interrupter disposed in the transformer housing below the oil level wherein the secondary circuit interrupter comprises:

a pair of stationary spaced apart contacts disposed within the said transformer housing below the oil level;

a bridging contact movable between an open position spaced from said pair of contacts and a closed position engaging said pair of contacts and completing an electrical connection therebetween;

biasing means urging said bridging contact to the open position;

latching means having a latched position holding said bridging contact in the closed position and an unlatched position permitting said bridging contact to move to the open position; and tripping means associated with said latching means to move said latching means to an unlatched position when current flow through the transformer exceeds a trip level;

an elongated contact arm pivotal about one end and having said bridging contact attached to the other end thereof;

toggle means connected intermediate the ends of said elongated contact arm being movable between an extended overcenter position forcing said bridging contact into engagement with said pair of stationary contacts and a collapsed position moving said bridging contact to a position spaced apart from said pair of stationary contacts;

biasing means biasing said toggle means towards the collapsed position;

said latching means, with the circuit interrupter normally closed, holding said toggle means in the extended overcenter position, and comprising a primary latch movable between a latch position holding said toggle means in the extended overcenter position and an unlatched position permitting said toggle to collapse, a second latch movable between a latched position holding said primary latch in the latched position and an unlatched position permitting said primary latch to unlatch, and spring-biasing means biasing said second latch to the unlatched position;

said tripping means comprising a rotatable cam surface which engages and prevents said second latch from tripping until said cam surface is rotated through a first angle; and said circuit interrupter further comprises current responsive means for rotating said cam surface an amount proportional to the flow of current through the transformer, and emergency control means connected to said rotatable cam surface for moving said rotatable cam surface to a different position in engagement with said second latch changing the current level at which said second latch unlatches.

10. A secondary circuit breaker disposed in the oil-filled housing of a distribution transformer, comprising:

a plurality of poles, each of said poles being associated with a connection to the secondary of the distribution transformer and comprising a pair of stationary contacts, a bridging contact movable between an open position spaced from said stationary contacts and a closed position engaging said contacts, and bimetal actuating means through which current flows and which deflects an amount related to current flow therethrough;

connecting means mechanically connecting the bridging contacts of each pole for simultaneous movement;

operating means linked to said connecting means for opening all poles of the circuit breaker when actuated;

trip bar means disposed to be moved by the bimetal means which is deflected the greatest amount, movement of said trip bar means actuating said operating means;

said operating means comprising toggle means connected to said connecting means and movable between an overcenter position holding each of said bridging contacts in the closed position and a collapsed position holding each of said bridging contacts in the open position, biasing means connected to said toggle means and biasing said toggle means to a collapsed position, latch means which when latched holds said toggle means in the overcenter position and which is unlatched when said trip bar means moves a selected distance tripping open the circuit breaker, said latch means comprises a primary latch which when latched holds said toggle means in the overcenter position, a secondary latch which when latch holds said primary latch in a latched position, second spring bias means biasing said secondary latch to an unlatched position; and said trip bar means comprises a cam surface portion against which said second biasing means biases said secondary latch, preventing said secondary latch from unlatching and the cam surface portion including a sharp cutoff edge which when said trip bar means is moved a selected amount is positioned under said secondary latch permitting said secondary latch to unlatch.

11. A secondary circuit breaker as claimed in claim 10 wherein:

said secondary latch has a latching surface extending transverse to said cam surface portion; said cam surface portion movable between a normal position and an overload position;

said latching surface constructed so that said cam surface portion must move further to unlatch when said cam surface is in the overload position than when the said cam surface is in the normal position.

12. A circuit interrupter comprising:

a first stationary contact;

a secondary stationary contact separated from said first stationary contact;

bridging contact means;

an elongated contact arm having said bridging contact means attached thereto and being pivotal in proximity to one end about an axis between a closed position wherein said bridging contact means completes an electric circuit between said first stationary contact and said second stationary contact, and an open position wherein said bridging contact is spaced apart from said first stationary contact and said second stationary contact;

primary latch means connected to said elongated contact arm and operable when in a latching position to maintain said elongated contact arm in the closed position;

a secondary latch comprising a latching surface and operable when in a latched position to maintain said primary latch means in the latching position; and bimetal actuating means comprising a bimetal through which the circuit interrupter current flows and which deflects an amount proportional to the current flow therethrough, and a cam including a recessed portion; said cam being connected to be rotated as said bimetal deflects;

said latching surface disposed transverse to said cam and being spring-biased to rest on said cam so that when said cam rotates its recessed portion under said latching surface said second latch rotates and unlatches, thereby effecting release of said primary latch and allowing said contact arm to pivot to the open position.

13. A circuit interrupter as claimed in claim 12 wherein:

said latching surface is constructed so that on a first portion of said latching surface said cam must rotate through a first arc to release said second latch and on a second portion of said latching surface said cam must rotate through a second arc greater than said first arc to release said secondary latch;

said circuit interrupter comprising emergency control means connected to said cam to move said cam from engagement with the first portion of said latching surface to engagement with the second portion of the latching surface.

14. A circuit breaker adapted for use in the oil-filled housing of a distribution transformer, comprising:

separable contacts operable between closed and open positions;

releasable latch means comprising a latching surface having first and second surface portions, said latch means maintaining said contacts in the closed position;

trip means engaging said latching surface and movable along a first line of action between first and second positions respectively engaging said first and second latching surface portions, said trip means movable along a second line of action to release said latch means upon first and second overload current levels through said transformer corresponding to said first and second engaging positions; and emergency control means for moving said trip means between said first and second engaging positions, thereby adjusting the tripping current level of said circuit breaker between said first and second overload current levels.

15. A circuit breaker as recited in claim 14 wherein said trip means comprises a cam having a recessed portion and a bimetal element disposed in relation to said cam and deflecting an amount proportional to the current flow through said circuit breaker, said deflection causing proportional rotation of said cam; and said latching surface is of varying width and is biased against said cam, said latching surface being released when said cam is rotated an amount sufficient to bring said recessed portion into contact with said latching surface.

16. A circuit breaker as recited in claim 15 wherein said latching surface is released upon rotation of said cam through a first arc when said trip means is in said first position, and is released upon rotation of said cam through a second arc greater than said first arc when said trip means is in said second position, thereby tripping said circuit breaker upon occurrence of a higher overload current when said trip means is in said second position than when said trip means is in said first position.

17. A circuit interrupter, comprising:

separable contacts;

releasable latch means disposed in relation to said contacts and comprising a latching surface of varying width having an edge release of said latch means operable to initiate separation of said contacts;

trip means comprising a rotatable cam having a recessed portion, said trip means producing rotation of said cam in response to overcurrent conditions through said contacts;

means for biasing said latching surface into contact with said cam toward an unlatched position, rotation of said recessed portion of said cam under said latching surface edge initiating release of said latch means and separation of said contacts; and emergency control means for moving said cam between contact with portions of said latching surface of varying width, whereby said cam must rotate through varying angular distances corresponding to varying overcurrent levels in order to rotate said recessed portion under said latching surface edge.

* * * * *